(12) United States Patent
Kim

(10) Patent No.: US 7,603,922 B2
(45) Date of Patent: Oct. 20, 2009

(54) METHOD OF CORRECTING SHIFT POSITION SENSOR OF VEHICLE

(75) Inventor: Chang-Hyun Kim, Hwasung-si (KR)

(73) Assignee: Hyundai Motor Company, Seoul (KR)

( * ) Notice: Subject to any disclaimer, the term of this patent is extended or adjusted under 35 U.S.C. 154(b) by 420 days.

(21) Appl. No.: 11/603,984

(22) Filed: Nov. 22, 2006

(65) Prior Publication Data

US 2008/0045376 A1    Feb. 21, 2008

(30) Foreign Application Priority Data

Aug. 21, 2006    (KR) ........................ 10-2006-078788

(51) Int. Cl.
F16H 59/00    (2006.01)
F16H 61/00    (2006.01)
F16H 63/00    (2006.01)
(52) U.S. Cl. ..................................... 74/335; 74/473.12
(58) Field of Classification Search .................... 74/335, 74/339, 473.12; 477/92, 94, 97, 906, 92.94; 701/51, 62; 307/10.1; 340/456
See application file for complete search history.

(56) References Cited

U.S. PATENT DOCUMENTS

| 4,918,606 A |   | 4/1990 | Ito et al. |
| 5,088,353 A |   | 2/1992 | Yoshida |
| 6,205,390 B1 | * | 3/2001 | Holbrook et al. .............. 701/62 |
| 7,203,587 B2 | * | 4/2007 | Tamaru et al. ................ 701/64 |
| 2005/0126322 A1 | * | 6/2005 | Kozaki et al. ................ 74/335 |

FOREIGN PATENT DOCUMENTS

JP    2005-061603    3/2005
KR    1020020030363 A    4/2002

* cited by examiner

*Primary Examiner*—David D. Le
(74) *Attorney, Agent, or Firm*—Morgan, Lewis & Bockius LLP

(57) ABSTRACT

A method of correcting shift position sensors of a vehicle, the sensors including an inhibitor switch and two or more analog sensors that detect angle displacement between a shift lever and a lever housing as a voltage change. The method includes determining a current condition of a transmission as a range P, when the inhibitor switch outputs signals corresponding to the range P; and inputting signals from the inhibitor switch and from the analog sensors, and determining the current condition of the transmission as a shift range that is indicated by a majority of the signals, when the inhibitor switch outputs signals corresponding to a range other than the range P.

10 Claims, 3 Drawing Sheets

METHOD OF CORRECTING SHIFT POSITION SENSOR OF VEHICLE

CROSS-REFERENCE TO RELATED APPLICATIONS

The present application is based on, and claims priority from, Korean Application Serial Number 10-2006-0078788, filed on Aug. 21, 2006, the disclosure of which is hereby incorporated by reference herein in its entirety.

FIELD OF THE INVENTION

The present invention relates to a method of correcting a shift position sensor of a vehicle and, more particularly, to a technique which improves stability of a vehicle by obtaining and determining more accurate and stable information on a shift position of a transmission.

BACKGROUND OF THE INVENTION

Conventionally, conditions of a transmission are determined exclusively depending on a signal of an inhibitor switch. Generally, when the inhibitor switch is broken and no signals can be detected, or when the inhibitor switch outputs overlapping signals, the transmission is determined to be broken. Due to the broken inhibitor switch, the transmission performs control of a limp home, that is, holding the gearshift lever in the third shift range.

In hybrid vehicles, which have relatively complex power trains which generate torque in various components to be provided to a driving wheel, it is required that safe control is performed by determining conditions of the transmission more accurately, thus, more practical and stable countermeasures to correct the inhibitor switch should be developed.

SUMMARY OF THE INVENTION

The present invention provides a method of correcting a shift position sensor of a vehicle, so as to enable more practical and stable countermeasures to correct shift position sensors, such as an inhibitor switch detecting conditions of a transmission.

An embodiment of the present invention provides a method of processing signals of the shift position sensors of a vehicle, the shift position sensors including an inhibitor switch and two or more analog sensors that detect relative angle displacement between a shift lever and a lever housing. In an exemplary method of correcting, when the inhibitor switch outputs signals in a range P, signals of the analog sensors are ignored and the current condition of the transmission is determined as range P, and when the inhibitor switch outputs signals in other shift ranges, the condition of the transmission is determined as a shift range that is indicated by the majority of the signals.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, exemplary embodiments of the present invention will be described with reference to the accompanying drawings.

Figure 1:
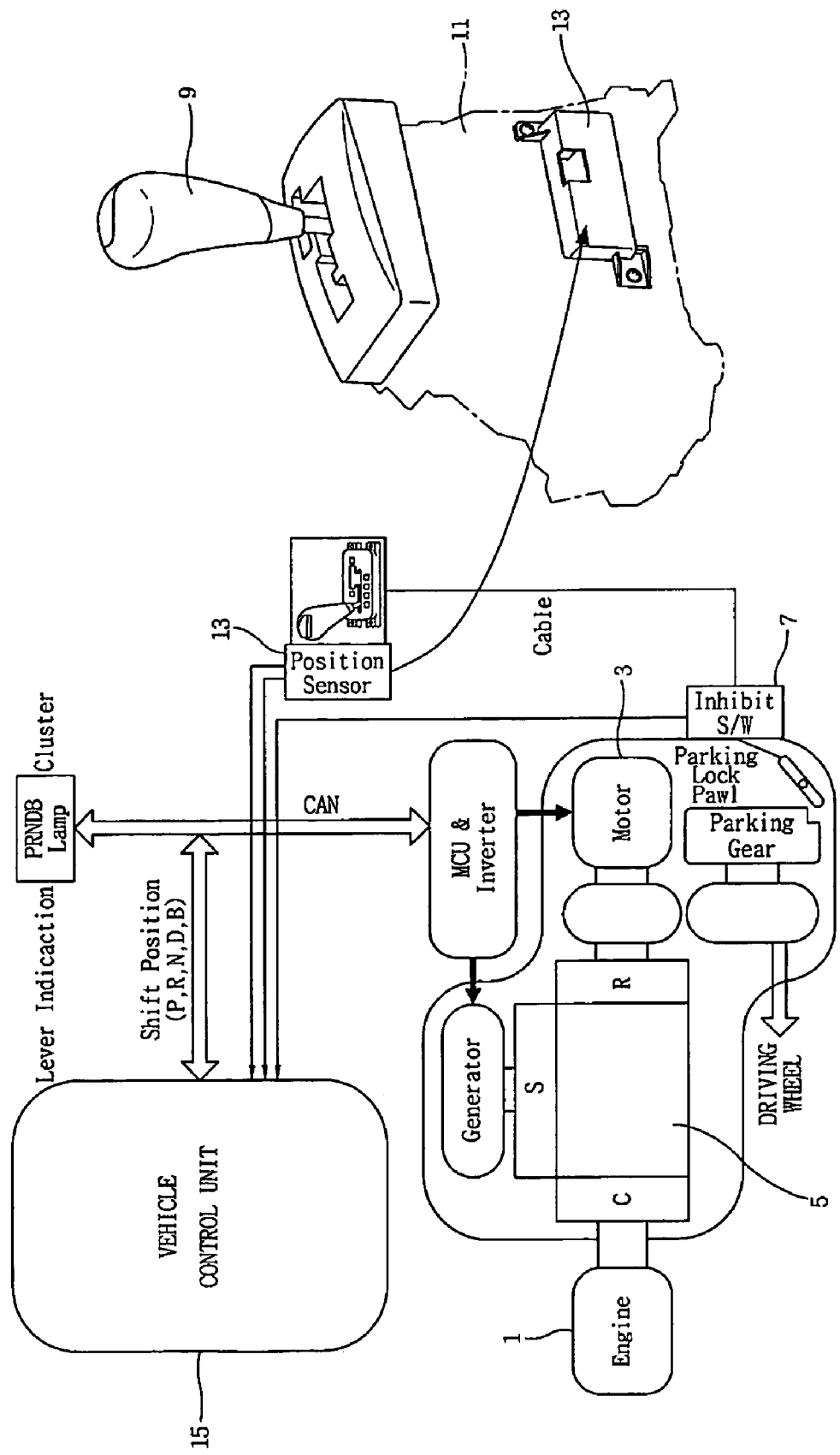
FIG. 1 is a view showing a power train of a hybrid vehicle and arrangement positions of shift position sensors, to which the present invention can be applied.

With reference to FIG. 1, according to an embodiment of the present invention, a hybrid power train delivers power of an engine 1 and a motor 3 to a driving wheel, using a planetary gear set 5. An inhibitor switch 7 is mounted in a transmission, two analog sensors 13 are mounted between a shift lever 9 and a lever housing 11 to detect relative angle displacement therebetween as voltage change.

While only one analog sensor 13 is illustrated in FIG. 1, a second sensor 13 is installed at the other side of lever housing 11 but not illustrated in the drawing. Two signal lines, one for each sensor 13, leading to a vehicle control unit 15, are illustrated in the drawing.

The shift position sensors include inhibitor switch 7 and analog sensors 13. An electronic element causing continuous changes of output voltage in accordance with operation state can be used as analog sensors 13. For example and without limitation, sensors 13 may be variable resistors or Hall effect sensors causing changes of output voltage corresponding to changes in magnetic flux.

When inhibitor switch 7 outputs signals in a range P, signals of the analog sensors 13 are ignored and the vehicle control unit (VCU) 15 determines the current condition of the transmission to be range P. When inhibitor switch 7 outputs signals in other shift ranges, the VCU 15 determines the condition of the transmission to be the shift range that is indicated by the majority of the three signals (one from inhibitor switch 7 and two from analog sensors 13). VCU 15 may include a processor, memory, and associated hardware, software, and/or firmware as may be selected and programmed by persons of ordinary skill in the art based on the teachings herein.

Figure 2:
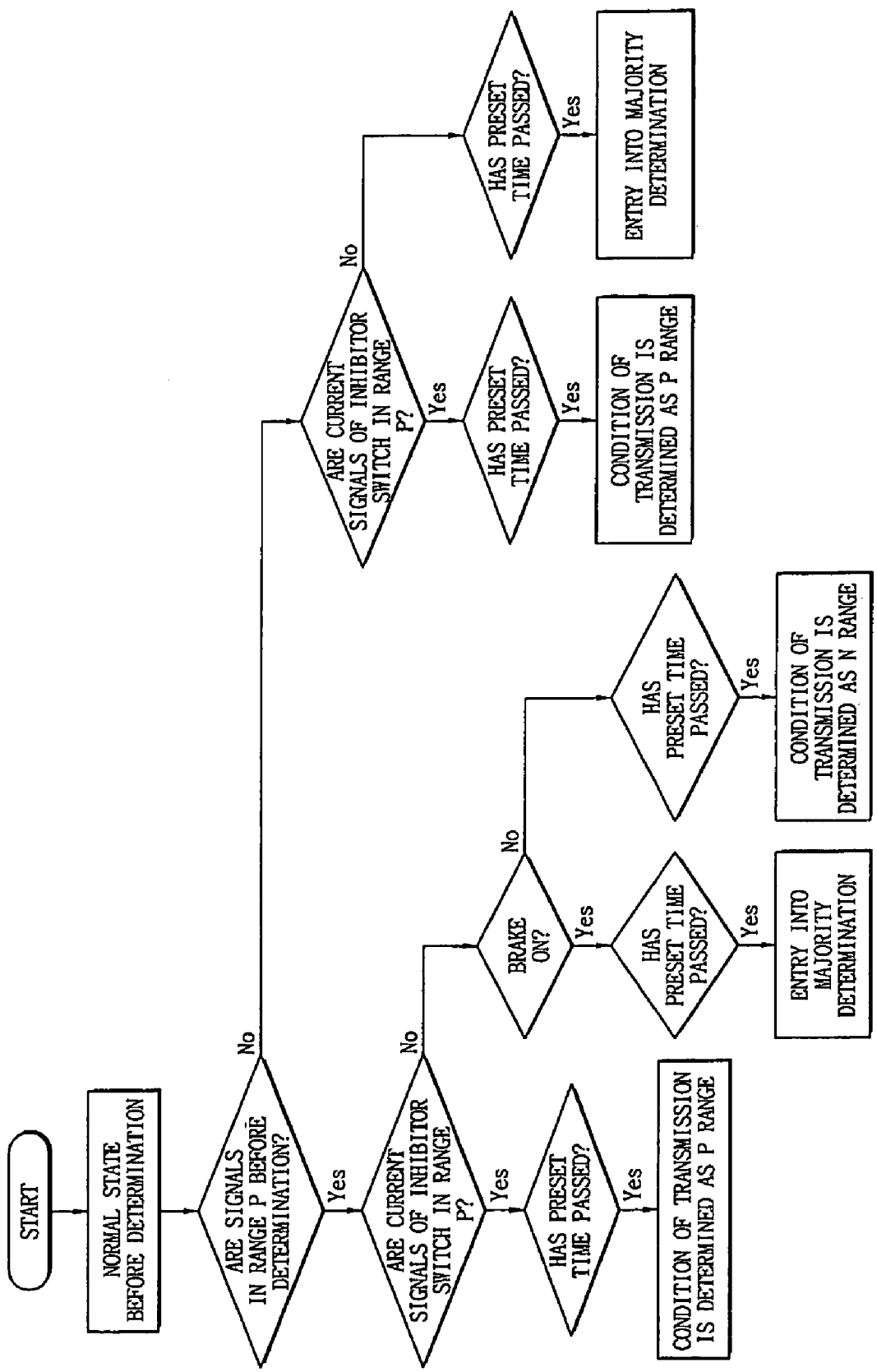
FIGS. 2 and 3 are flow charts illustrating a method of correcting the shift position sensor of the vehicle according to exemplary embodiments of the present invention.

With reference to FIG. 2, if signals of inhibitor switch 7 and analog sensors 13 were in range P in a normal state before determining the current condition, and the current signals of inhibitor switch 7 are not in range P, when a driver steps on a brake, VCU 15 determines the condition of the transmission as a shift range that is indicated by the majority of the signals. If the driver does not step on the brake, the condition of the transmission is determined as an N range.

Since the driver needs to step on the brake pedal to convert P range to another shift range, a brake sensor detects when the brake pedal is stepped on, and when the driver steps on the brake pedal, the current state is considered as normal, thus determining the condition of the transmission as a shift range that is indicated by the majority of signals of the shift position sensors. On the other hand, if the driver does not step on the brake pedal, signals of inhibitor switch 7 change from P range to another shift range, it is then an error has occurred, thus determining the condition of the transmission as N range.

If signals of inhibitor switch 7 and analog sensors 13 are all in P range in a normal state before determining the current condition and the inhibitor switch 7 is also in P range, the other signals are ignored and the condition of the transmission is determined as P range.

Whether a preset time has elapsed or not is determined in the flow chart, in order to prevent a wrong determination, for example, passing by other shift ranges to select a desired shift range operating shift lever 9. In exemplary embodiments, the preset time is about 400 ms.

If none of the signals of inhibitor switch 7 and analog sensors 13 are in P range in a normal state before determining the current conditions, the condition of the transmission is determined to be the shift range that is indicated by the majority of the signals.

If none of the signals of inhibitor switch 7 and analog sensors 13 were in P range in a normal state before determining the current condition, and the signal of inhibitor switch 7 is in P range in the current state, signals of analog sensors 13 in other shift ranges are ignored, thus determining the condition of the transmission as P range.

Figure 3:
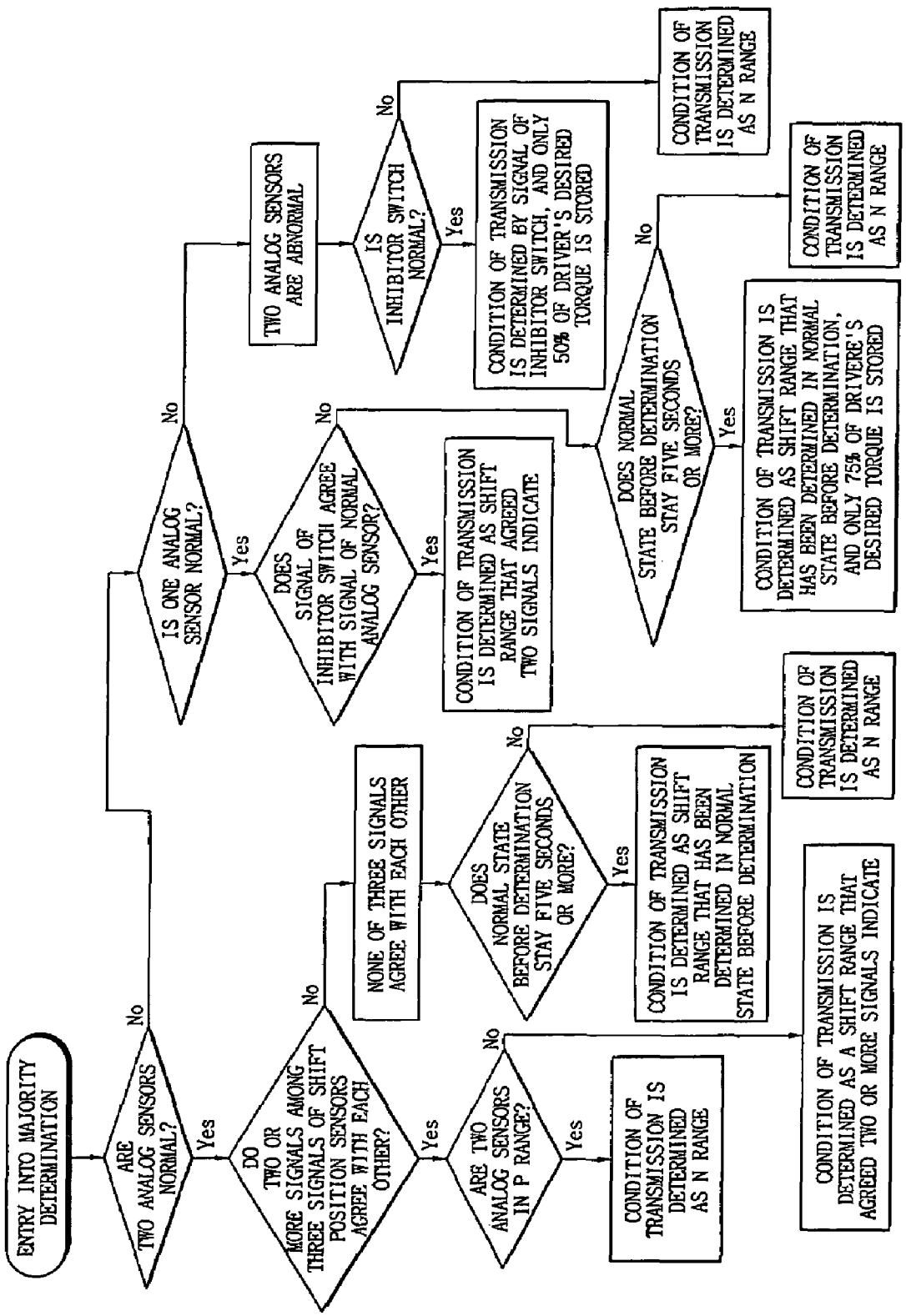

The process of determining the condition of the transmission as a shift range that is indicated by the majority of the signals will now be described. FIG. 2 illustrates steps before entry into majority determination, and FIG. 3 illustrates steps after the entry into majority determination of FIG. 2.

If the two analog sensors 13 are both normal, it is determined whether two or more of the signals of the inhibitor switch 7 and the two analog sensors 13 agree with each other.

If two or more signals agree with each other, if signals of the two analog sensors 13 are both in P range, the condition of the transmission is determined as N range; otherwise, the condition of the transmission is determined as a shift range that is indicated by the agreed two or more signals.

In other words, if two analog sensors 13 are normal, if signals of two analog sensors 13 are in P range, taking signals of inhibitor switch 7 into consideration, signals of inhibitor switch 7 are not in P range in the current state; therefore, it is considered that an error has occurred, thus determining the condition of the transmission as N range; if none of the signals of two analog sensors 13 are in P range, the current condition of the transmission is determined as a shift range that is indicated by two or more agreed signals among signals of the three shift position sensors.

Therefore, in this case, when the three shift position sensors are normal and signals thereof agree with each other is also taken into consideration.

Further, while two analog sensors 13 are both normal, if two or more signals do not agree with each other, and if a normal state before determining the current condition occurred over a preset time, the condition of the transmission is determined as a shift range which was determined in the normal state before determining the current condition. If a normal state before determining the current condition did not occur over the preset time, the condition of the transmission is determined as N range.

In exemplary embodiments, the preset time is about 5 seconds.

That is, in an abnormal case in which none of the three signals agree with each other, if a normal state is maintained for five seconds or more, a shift range of the normal state before determining the current condition is considered reliable and remains in the same state as the transmission. On the other hand, if the normal state is not maintained for five seconds or more, a shift range of the normal state is not considered reliable, thus determining the condition of the transmission as N range.

If only one of two analog sensors 13 is normal, when a signal of inhibitor switch 7 agrees with the signal of the normal analog sensor 13, the condition of the transmission is determined as a shift range of the agreed signals. Further, when a signal of inhibitor switch 7 does not agree with a signal of the normal analog sensor 13, if a normal state before determining the current condition occurred over a preset time, the condition of the transmission is determined as a shift range that has been determined in the normal state before determining the current condition, and 20% or more of the driver's desired torque is subtracted before storage.

If a torque level that is required while stepping on an accelerator pedal is deemed 100%, at least about 20% of the torque is lowered and thus at most 80% of the torque is taken into account for determination. If none of the three sensors agree with each other, even though the normal state before determining the current condition is maintained for five seconds or more, which is considered reliable, it is not preferable that there is 100% torque output with respect to the driver's operation of an accelerator pedal.

According to exemplary embodiments of the present invention, as shown in FIG. 3, 75% of the driver's desired torque is stored before determination.

If a normal state before determining the current condition is less than a preset time, the condition of the transmission is determined as N range. If two analog sensors 13 are both abnormal, it is determined whether inhibitor switch 7 is normal or not. If inhibitor switch 7 is determined as normal, the current condition of the transmission is determined as a shift range that is indicated by inhibitor switch 7, and at least about 40% of the driver's desired torque is subtracted before storage. If inhibitor switch 7 is determined as abnormal, the condition of the transmission is determined as N range.

In other words, if two analog sensors 13 are both abnormal, signals thereof are ignored, but if inhibitor switch 7 is normal, the condition of the transmission is determined according to the signal thereof; however, the level of the driver's desired torque for operation of the accelerator pedal is decreased to 60% or less for determination.

According to exemplary embodiments, 50% of the driver's desired torque is stored for determination in FIG. 3.

As described above, in determining whether the shift position sensors need to be corrected or not, if signals of inhibitor switch 7 include two or more overlapping signals in park (P); reverse (R); neutral (N); drive (D); and low, engine braking (B) ranges, or inhibitor switch 7 outputs none, it is determined that inhibitor switch 7 needs to be corrected.

If analog sensors 13 indicate voltage out of discontinuous series of voltage ranges indicating P, R, N, D, B ranges, it is determined that analog sensor 13 needs to be corrected.

In some embodiments, analog sensors 13 determine discontinuous series of voltage ranges, such as 0.5 to 0.9V, 1.4 to 1.8V, 2.3 to 2.7V, 3.2 to 3.6V, and 4.1 to 4.4V, as P, R, N, D, B ranges, respectively. In addition, if analog sensor 13 indicate a voltage range less than 0.2V or more than 4.8V, it is determined that analog sensor 13 needs to be corrected.

According to the present invention, the condition of the transmission is determined more accurately, while providing more practical and stable countermeasures to correct shift position sensors, such as an inhibitor switch detecting the condition of the transmission.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of correcting shift position sensors of a vehicle, the sensors comprising an inhibitor switch detecting a current condition of a transmission and two or more analog sensors that detect angle displacement between a shift lever and a lever housing as a voltage change, comprising the steps of:

determining the current condition of the transmission as a range P, when the inhibitor switch outputs signals corresponding to the range P; and inputting signals from the inhibitor switch and from the analog sensors, and determining the current condition of the transmission as a shift range that is indicated by a majority of the signals, when the inhibitor switch outputs signals corresponding to a range other than the range P, wherein the two or more analog sensors are exactly two analog sensors, and wherein the step of determining the condition as a shift range that is indicated by the majority of the signals comprises:

determining whether two of the signals agree with each other or not, if the two analog sensors are both normal; and determining the condition of the transmission as an N range, if two or more of the signals agree with each other and signals of the two analog sensors are both in P range, otherwise determining the condition as a shift range that is indicated by the agreed two or more signals;

when the two analog sensors are both normal, if two or more of the signals are determined not to agree with each other, if a normal state before determining the current condition existed over a preset time, determining the condition of the transmission as a shift range that was determined in the normal state before determining the current condition, and if the normal state before determining the current condition did not exist over the preset time, determining the condition of the transmission as the N range.

2. The method as defined in claim 1, further comprising, if the signals of the inhibitor switch and the analog sensors correspond to the range P in the normal state before determining the current condition, and if the signals of the inhibitor switch do not correspond to the range P, when a driver steps on a brake, determining the current condition as a shift range that is indicated by the majority of the signals, and when the driver does not step on the brake, determining the current condition of the transmission as a range N.

3. The method as defined in claim 1, further comprising, if none of the signals of the inhibitor switch and the analog sensors correspond to the P range in the normal state before determining the current condition, and if the signals of the inhibitor switch do not correspond to the P range in the current state, determining the current condition as a shift range that is indicated by the majority of the signals.

4. The method as defined in claim 1, wherein if the two analog sensors are both abnormal, it is determined whether the inhibitor switch is normal or not, if the inhibitor switch is determined as normal, the current condition of the transmission is determined as a shift range that is indicated by the inhibitor switch, and 40% of the driver's desired torque is subtracted before storage, and if the inhibitor switch is determined as abnormal, the condition of the transmission is determined as the N range.

5. The method as defined in claim 1, further comprising determining whether the shift position sensors need to be corrected or not, the determining whether the shift position sensors need to be corrected or not comprising:

determining that the inhibitor switch needs to be corrected, if the signals of the inhibitor switch include two or more overlapping signals, or the inhibitor switch outputs no signals; and determining that one of the analog sensors needs to be corrected, if the one of the analog sensors indicates a voltage out of a discontinuous series of voltage ranges.

6. A method of correcting shift position sensors of a vehicle, the sensors comprising an inhibitor switch detecting a current condition of a transmission and two or more analog sensors that detect angle displacement between a shift lever and a lever housing as a voltage change, comprising the steps of:

determining the current condition of the transmission as a range P, when the inhibitor switch outputs signals corresponding to the range P; and inputting signals from the inhibitor switch and from the analog sensors, and determining the current condition of the transmission as a shift range that is indicated by a majority of the signals, when the inhibitor switch outputs signals corresponding to a range other than the range P, wherein the two or more analog sensors are exactly two analog sensors, and wherein the step of determining the condition as a shift range that is indicated by the majority of the signals comprises:

determining whether two of the signals agree with each other or not, if the two analog sensors are both normal; and determining the condition of the transmission as an N range, if two or more of the signals agree with each other and signals of the two analog sensors are both in P range, otherwise determining the condition as a shift range that is indicated by the agreed two or more signals;

wherein if only one of the two analog sensors is normal, when a signal of the inhibitor switch agrees with a signal of the normal analog sensor, the condition of the transmission is determined as a shift range of the agreed signals, when the signal of the inhibitor switch does not agree with the signal of the normal analog sensor, if a normal state before determining the current condition existed over a preset time, the condition of the transmission is determined as a shift range that was determined in the normal state before determining the current condition, and 20% or more of a driver's desired torque is subtracted before storage, and if the normal state before determining the current condition did not exist over a preset time, the condition of the transmission is determined as the N range.

7. The method as defined in claim 6, further comprising, if the signals of the inhibitor switch and the analog sensors correspond to the range P in the normal state before determining the current condition, and if the signals of the inhibitor switch do not correspond to the range P, when a driver steps on a brake, determining the current condition as a shift range that is indicated by the majority of the signals, and when the driver does not step on the brake, determining the current condition of the transmission as a range N.

8. The method as defined in claim 6, further comprising, if none of the signals of the inhibitor switch and the analog sensors correspond to the P range in the normal state before determining the current condition, and if the signals of the inhibitor switch do not correspond to the P range in the current state, determining the current condition as a shift range that is indicated by the majority of the signals.

9. The method as defined in claim 6, wherein if the two analog sensors are both abnormal, it is determined whether the inhibitor switch is normal or not,
   if the inhibitor switch is determined as normal, the current condition of the transmission is determined as a shift range that is indicated by the inhibitor switch, and 40% of the driver's desired torque is subtracted before storage, and
   if the inhibitor switch is determined as abnormal, the condition of the transmission is determined as the N range.

10. The method as defined in claim 6, further comprising determining whether the shift position sensors need to be corrected or not, the determining whether the shift position sensors need to be corrected or not comprising:
   determining that the inhibitor switch needs to be corrected, if the signals of the inhibitor switch include two or more overlapping signals, or the inhibitor switch outputs no signals; and
   determining that one of the analog sensors needs to be corrected, if the one of the analog sensors indicates a voltage out of a discontinuous series of voltage ranges.

* * * * *